US012560484B2

(12) United States Patent
Sim et al.

(10) Patent No.: US 12,560,484 B2
(45) Date of Patent: Feb. 24, 2026

(54) COMPUTER DISPLAY WITH INTEGRATED COLORIMETER

(71) Applicant: Dell Products L.P., Round Rock, TX (US)

(72) Inventors: Tiak Hooy Sim, Singapore (SG); Tze Fung Chung, Singapore (SG); Seen Yee Cindy Cheong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/631,496

(22) Filed: Apr. 10, 2024

(65) Prior Publication Data

US 2024/0255353 A1 Aug. 1, 2024

Related U.S. Application Data

(63) Continuation of application No. 16/276,244, filed on Feb. 14, 2019, now Pat. No. 11,976,977.

(51) Int. Cl.
| | |
|---|---|
| *G01J 3/50* | (2006.01) |
| *G01J 3/02* | (2006.01) |
| G09G 5/02 | (2006.01) |

(52) U.S. Cl.
CPC ............. *G01J 3/506* (2013.01); *G01J 3/0291* (2013.01); *G01J 3/0297* (2013.01); *G09G 5/02* (2013.01); *G09G 2360/145* (2013.01)

(58) Field of Classification Search
CPC ........ G01J 3/506; G01J 3/0291; G01J 3/0297; G09G 2360/145; G09G 5/02
See application file for complete search history.

(56) References Cited

U.S. PATENT DOCUMENTS

| | | | |
|---|---|---|---|
| 2,100,992 | A | 11/1937 | Woodhead et al. |
| 4,436,989 | A | 3/1984 | Schuldt |
| 4,983,999 | A | 1/1991 | Meisezahl et al. |
| 7,345,669 | B2 | 3/2008 | Ohashi et al. |
| 8,743,101 | B2 | 6/2014 | Kaji et al. |
| 9,176,005 | B2 | 11/2015 | Hogo et al. |
| 2005/0162376 | A1 | 7/2005 | Sunoue et al. |
| 2005/0204373 | A1 | 9/2005 | Ueno et al. |
| 2008/0204437 | A1 | 8/2008 | Jensen |
| 2009/0009501 | A1* | 1/2009 | Shiba ........................ G01J 1/02 |
| | | | 345/207 |
| 2010/0289783 | A1 | 11/2010 | Leppla |

(Continued)

*Primary Examiner* — Hwa Andrew Lee
(74) *Attorney, Agent, or Firm* — Fogarty LLP

(57) ABSTRACT

An Information Handling System (IHS) display includes an integrated colorimeter that is stored within a front-facing bezel that borders one side of the display screen. The front-facing bezel includes hinged door that conceals a compartment housing a tray. The tray includes a colorimeter and is deployed from the front-facing bezel via the hinged door. With the tray deployed, the colorimeter is raised from the tray and positioned for measuring light emitted by the screen. The deployment of the tray from the front-facing bezel is along an axis perpendicular to the screen and the raising of the colorimeter from the deployed tray is along an axis parallel to the screen. The raised colorimeter may be positioned closer to the screen though movement of the tray along the axis perpendicular to the screen, thus reducing ambient light that reaches a colorimeter sensor of the colorimeter.

4 Claims, 7 Drawing Sheets

(56)                    References Cited

U.S. PATENT DOCUMENTS

| | | |
|---|---|---|
| 2014/0091210 A1 | 4/2014 | Hogo et al. |
| 2017/0025054 A1* | 1/2017 | Su .......................... G06F 1/1601 |
| 2018/0120163 A1 | 5/2018 | Su et al. |
| 2020/0074903 A1 | 3/2020 | Chen et al. |

* cited by examiner

COMPUTER DISPLAY WITH INTEGRATED COLORIMETER

CROSS REFERENCE TO RELATED APPLICATIONS

This patent application claims priority to, and is a continuation of co-pending, commonly assigned U.S. patent application Ser. No. 16/276,244, filed Feb. 14, 2019 and also entitled "Computer Display with Integrated Colorimeter" and pending issuance, and which is hereby incorporated herein by reference.

FIELD

This disclosure relates generally to Information Handling Systems (IHSs), and more specifically, to displays for IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs may utilize a wide variety of displays. For certain IHSs, such a portable IHSs, a display in an integral component of the IHS. Certain IHSs, some of which may include an integrated display, may also support the use of an external display monitor. Certain uses of IHSs, such as for certain engineering, manufacturing and media applications, may frequently incorporate the use of an external display that provides a large screen and high resolutions. Some of these applications may be extremely color-critical, thus requiring reliable and accurate color performance by the monitors. In many of such scenarios, these applications are utilized within collaborative multi-user environment such that colors must be displayed consistently across the displays of all users. The displays for such users may require frequent calibration to ensure that colors are displayed accurately and consistently across each display within a multi-display system. Such calibration of display monitors may be performed using a tool that is referred to as a colorimeter.

SUMMARY

In various embodiments, a display is provided for presenting information generated by an Information Handling System (IHS). The display includes: a screen; a front-facing bezel bordering the screen on at least one side, wherein a portion of the front-facing bezel comprises a hinged door; a compartment housing a tray that is concealed behind the hinged door when the tray is stored; and the tray housing a colorimeter, wherein the tray is deployed from the front-facing bezel via the hinged door and wherein the colorimeter is raised from the deployed tray for measuring light emitted by the screen.

In additional display embodiments, the deployment of the tray from the front-facing bezel moves the colorimeter along an axis perpendicular to the screen. In additional display embodiments, the raising of the colorimeter from the deployed tray moves the colorimeter along an axis parallel to the screen. In additional display embodiments, the raised colorimeter is positioned closer to the screen though movement of the tray along the axis perpendicular to the screen. In additional embodiments, the display includes a tray driving motor that is operated to move the tray along the axis perpendicular to the screen. In additional embodiments, the display includes a sensor motor that is operated to raise the colorimeter from the deployed tray along the axis parallel to the screen. In additional display embodiments, the positioning of the colorimeter closer to the screen reduces ambient light reaching a colorimeter sensor of the colorimeter. In additional display embodiments, the colorimeter sensor is surrounded by a light-blocking material and wherein the positioning of the colorimeter closer to the screen places the light-blocking material in contact with the screen. In additional display embodiments, the tray driving motor operates a drive shaft that engages gears the move the tray along the axis perpendicular to the screen. In additional display embodiments, the sensor motor operates a gear system that engages a gear of the colorimeter that rotates the colorimeter along the axis parallel to the screen.

In various additional embodiments, a system is provided for deploying an integrated colorimeter of a display for presenting information generated by an Information Handling System (IHS). The system includes: a portion of a front-facing bezel bordering the display on at least one side, wherein the portion of the front-facing bezel comprises a hinged door; a compartment housing a tray that is concealed behind the hinged door when the tray is stored; and the tray housing the integrated colorimeter, wherein the tray is deployed from the front-facing bezel via the hinged door and wherein the colorimeter is raised from the deployed tray for measuring light emitted by a screen of the display.

In additional system embodiments, the deployment of the tray from the front-facing bezel moves the colorimeter along an axis perpendicular to the screen. In additional system embodiments, the raising of the colorimeter from the deployed tray moves the colorimeter along an axis parallel to the screen. In additional system embodiments, the raised colorimeter is positioned closer to the screen though movement of the tray along the axis perpendicular to the screen. In additional embodiments, the system includes a tray driving motor that is operated to move the tray along the axis perpendicular to the screen and further comprising a sensor motor that is operated to raise the colorimeter from the deployed tray along the axis parallel to the screen. In additional system embodiments, a colorimeter sensor of the colorimeter is surrounded by a light-blocking material and wherein the positioning of the colorimeter closer to the screen places the light-blocking material in contact with the screen.

In various additional embodiments, a method is provided for deploying an integrated colorimeter of a display for presenting information generated by an Information Handling System (IHS). The method includes: concealing a compartment housing a tray behind a hinged door that comprises a portion of a front-facing bezel bordering the display on at least one side; deploying the tray from the front-facing bezel via the hinged door through operation of a tray driving motor that moves the tray along an axis perpendicular to the screen; raising the integrated colorimeter from within a cavity of the tray through the operation of a sensor motor that moves the colorimeter along an axis parallel to the screen; and measuring, by the raised integrated colorimeter, light emitted by a screen of the display.

In additional embodiments, the method further includes positioning the raised colorimeter closer to the screen though additional movement of the tray along the axis perpendicular to the screen by the tray driving motor. In additional method embodiments, a colorimeter sensor of the integrated colorimeter is surrounded by a light-blocking material and wherein the positioning of the colorimeter closer to the screen places the light-blocking material in contact with the screen. In additional method embodiments, placing the light-blocking material in contact with the screen blocks ambient light from reaching the colorimeter sensor.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
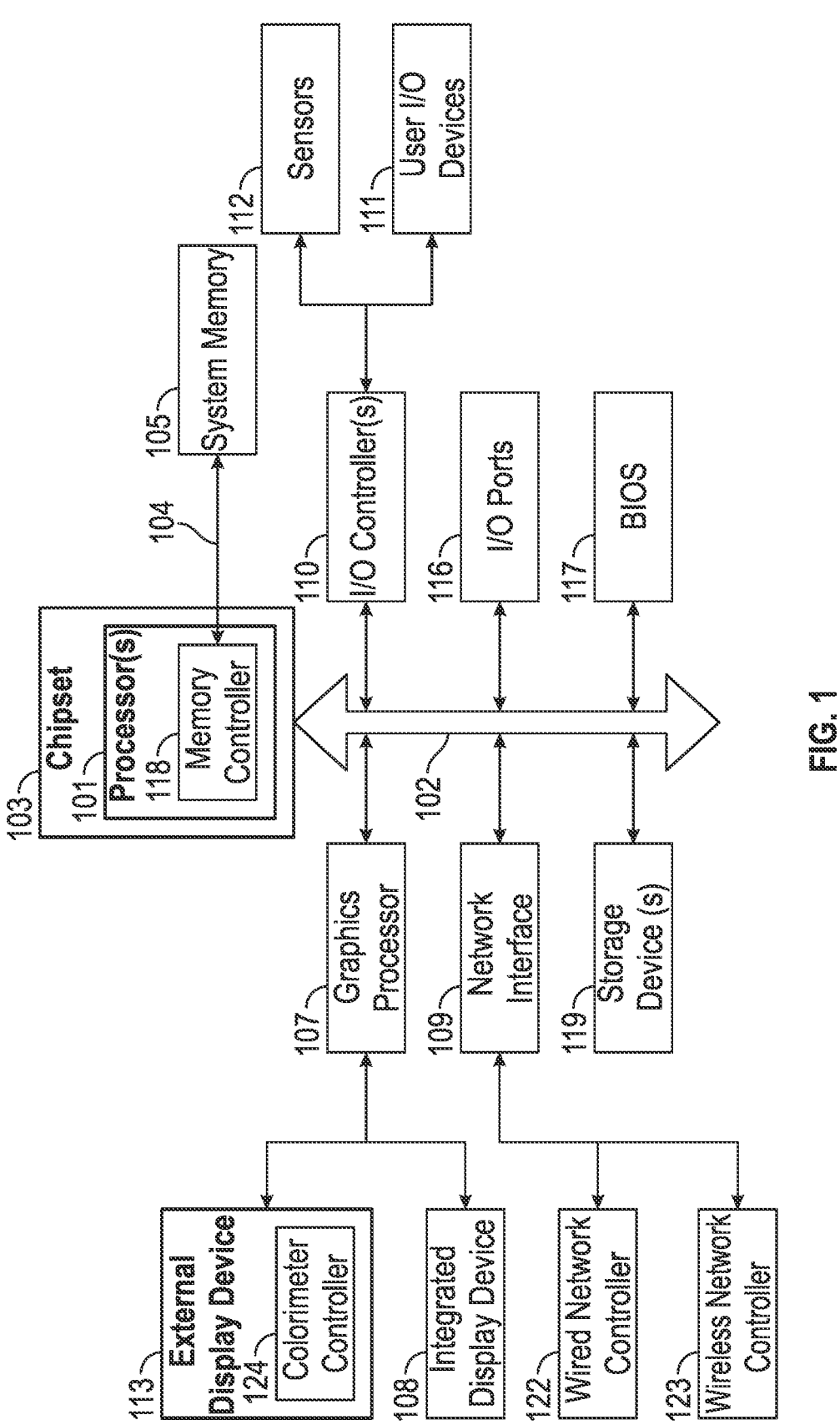
FIG. 1 is a block diagram depicting certain components of an IHS operable according to various embodiments for use with a display that includes an integrated colorimeter.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

As described, certain IHS displays may be used in extremely color-critical scenarios, thus requiring reliable and accurate color performance by the display. Colorimeters may be used to measure and calibrate the color output of a display used in such color-critical scenarios. As described in additional detail with regard to the below embodiments, a display may include an integrated colorimeter that may be configured to automatically deploy to measure and calibrate the color output of a display. The integrated colorimeter may be configured to deploy and calibrate the display at designated times, such as overnight, when the display is not in use. An integrated colorimeter according to embodiments may be a component of an external IHS display.

FIG. 1 is a block diagram illustrating certain components of an IHS 100 configured according to certain embodiments for use with a display that includes an integrated colorimeter. While a single IHS 100 is illustrated in FIG. 1, IHS 100 may be a component of an enterprise system that may include any number of additional IHSs that may also be configured in the same or similar manner to IHS 100. IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 provides the processor 101 with a high-speed memory that may be used in the execution of computer program instruc- tions by the processor 101. Accordingly, system memory 105 may include memory components, such as such as static RAM (SRAM), dynamic RAM (DRAM), NAND Flash memory, suitable for supporting high-speed memory opera- tions by the processor 101. In certain embodiments, system memory 105 may combine both persistent, non-volatile memory and volatile memory. In certain embodiments, the system memory 105 may be comprised of multiple remov- able memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the HS 100 through the chipset 103. For instance, chipset 103 may be coupled to a network interface 109 that may support different types of network connectivity. In certain embodiments, IHS 100 may include one or more Network Interface Controllers (NIC), each of which may implement the hardware required for communi- cating via a specific networking technology, such as Wi-Fi, BLUETOOTH, Ethernet and mobile cellular networks (e.g., CDMA, TDMA, LTE). As illustrated, network interface 109 may support network connections by wired network con- trollers 122 and wireless network controller 123. Each network controller 122, 123 may be coupled via various buses to the chipset 103 of IHS 100 in supporting different types of network connectivity, such as the network connec- tivity utilized in applications of the operating system of IHS 100.

Chipset 103 may also provide access to one or more display device(s) 108, 113 via graphics processor 107. In certain embodiments, graphics processor 107 may be com- prised within a video or graphics card or within an embed- ded controller installed within IHS 100. In certain embodi- ments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. As illustrated, IHS 100 may support an integrated display device 108, such as a display integrated into a laptop, tablet, 2-in-1 convertible device, or mobile device.

IHS 100 may also support use of one or more external displays 113, such as external display monitors that may be coupled to IHS 100 via various types of couplings. As described, in certain applications, the color accuracy of an external display may be extremely critical and may thus require regular testing and calibration. As illustrated, an IHS 100 may be coupled to an external display 113 that includes an integrated colorimeter 124. As described in additional detail with regard to the embodiments of FIGS. 4-6, an external display may include a compartment in which an integrated colorimeter 124 is housed and concealed within a front-facing bezel of the external display. The external display 113 may include a colorimeter controller that is configured to operate motors that drive gear systems that move the colorimeter 124 out of the concealed compartment and raise the colorimeter 124, thus positioning a colorimeter sensor facing the screen of the external display 113. From this position, the colorimeter 124 may be moved back towards the screen in order to position the colorimeter sensor closer to the screen. In various embodiments, the colorimeter controller may be implemented in other types of logic units, such as a system-on-chip.

From a deployed position, the integrated colorimeter 124 may capture light emitted by the screen of the external display 113 in order to support calibration of the displayed colors. In various embodiments, the sensor readings cap- tured by the integrated colorimeter 124 may be transmitted to the IHS 100, where software applications analyze the sensor data and determine any necessary calibrations of the external display 113. In various embodiments, the controller operating the integrated colorimeter 124 may be directed, by applications running on the IHS 100, to deploy the inte- grated colorimeter 124 and to initiate measurements in support of a calibration routine. These deployment and measurement operations may be initiated during times when the external display 113 is not being used.

In certain embodiments, chipset 103 may utilize one or more I/O controllers 110 that may each support hardware components such as user I/O devices 111 and sensors 112. For instance, I/O controller 110 may provide access to one or more user I/O devices 110 such as a keyboard, mouse, touchpad, touchscreen, microphone, speakers, camera and other input and output devices that may be coupled to IHS 100. Each of the supported user I/O devices 111 may interface with the I/O controller 110 through wired or wireless connections.

In certain embodiments, sensors 112 accessed via I/O controllers 110 may provide access to data describing envi- ronmental and operating conditions of IHS 100. For instance, sensors 112 may include geo-location sensors capable for providing a geographic location for IHS 100, such as a GPS sensor or other location sensors configured to determine the location of IHS 100 based on triangulation and network information. Various additional sensors, such as optical, infrared and sonar sensors, that may provide support for xR (virtual, augmented, mixed reality) sessions hosted by the IHS 100.

Other components of IHS 100 may include one or more I/O ports 116 the support removable couplings with various types of peripheral external devices. For instance, I/O 116 ports may include USB (Universal Serial Bus) ports, by which a variety of external devices may be coupled to IHS 100. I/O ports 116 may include various types of ports and couplings that support connections with external devices and systems, either through temporary couplings via ports, such as USB ports, accessible to a user via the enclosure of the IHS 100, or through more permanent couplings via expan- sion slots provided via the motherboard or via an expansion card of IHS 100, such as PCIe slots.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
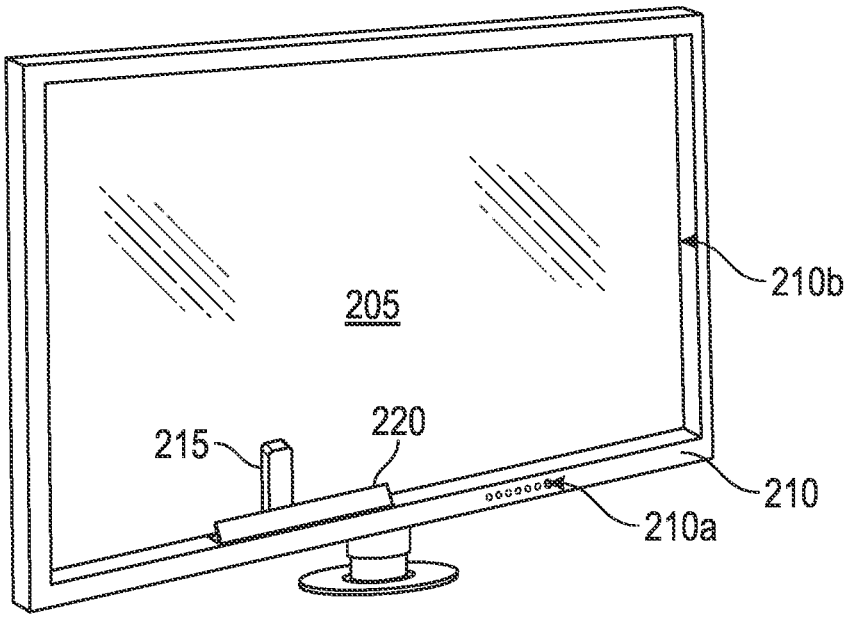
FIG. 2 is an illustration of a prior art computer display that includes an integrated colorimeter.

FIG. 2 is an illustration of an existing computer display that includes a colorimeter. The existing display includes a screen 205 that is surrounded by a bezel 210. As illustrated, the bezel 210 of the existing display includes a front-facing (i.e. user-facing) portion 210a and an inner-facing lip 210b that borders the screen 205. This inner-facing lip 210b adds a width to this portion of the bezel 210 such that the screen 205 is recessed within the bezel 210, where the amount of recess created by the lip 210b is wide enough to accommodate a colorimeter 215. Certain existing displays include a colorimeter 215 that is housed within a compartment of the bezel 210 and that emerges from the lib 210b to be positioned for measurement of the color output of the screen 205.

As illustrated, the lip 210b of the bezel 210 may include a door 220 from which the colorimeter 215 emerges from its compartment within the bezel 210. In this existing configuration, the colorimeter 215 is rotated 90 degrees counter-clockwise from within the bezel compartment until the colorimeter 215 is oriented upwards towards the top of the screen 205. From this deployed position, the existing colorimeter is ready for operation. As described in additional detail with regard to the below embodiments, the accuracy of such existing colorimeters is limited by its deployment in which the colorimeter 215 is rotated out of its housing and remains at a fixed distance from the screen 205.

Figure 3:
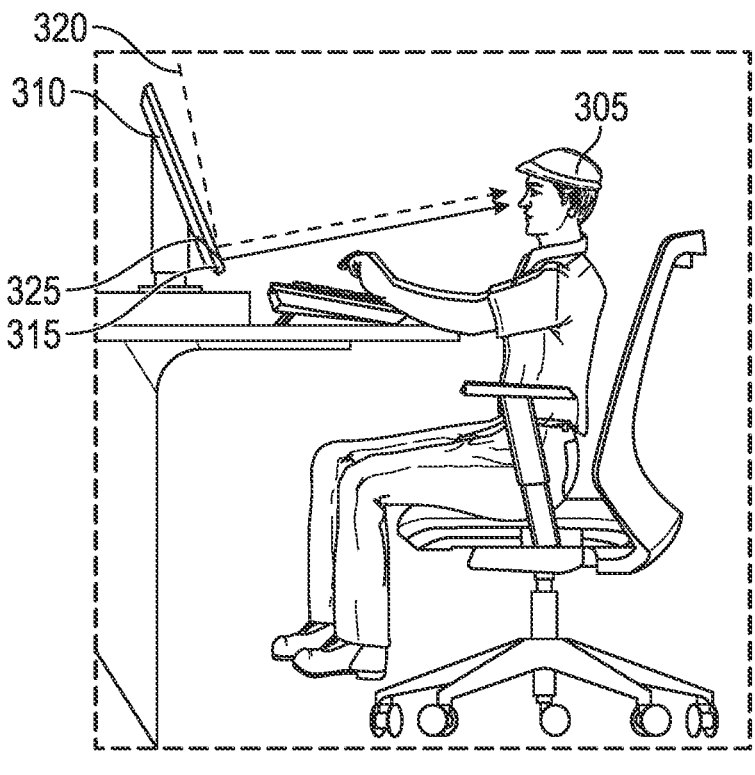
FIG. 3 is a diagram illustrating certain disadvantages of prior art computer displays that include an integrated colorimeter.

FIG. 3 is a diagram illustrating certain disadvantages of existing computer displays that include a colorimeter, such as the monitor described with regard to FIG. 2. In FIG. 3, a user 305 is seated at a desk on which an existing display 310 is positioned. As with the existing colorimeter of FIG. 2, the display 310 includes a bottom lip 315 that is an inner-facing portion of the bottom bezel. As described, the lip 315 of a display 310 with an existing colorimeter is wide enough to accommodate the colorimeter and for a door allowing the colorimeter to be retracted within a compartment of the bottom bezel. Accordingly, the bottom lip of an existing display 310 that includes a colorimeter is of substantial width.

As illustrated in FIG. 3, the width of this bottom lip 315 of the bezel of an existing display 310 results in glare that affects the user's 305 ability to view the screen of display 310. One source of such glare is ceiling light 320, or other ambient light, that is reflected off the bottom lip 315 of the bezel of an existing display that includes a colorimeter. Another source of glare for user 305 is the emitted light 325 from the screen of the display 310 that is also reflected off the bottom lip 315 of bezel of an existing display that includes a colorimeter. As illustrated, both sources of light 320 and 325 that reflect off the bottom lip 315 of an existing display result in glare directed at the eyes of user 305.

Figure 4A:
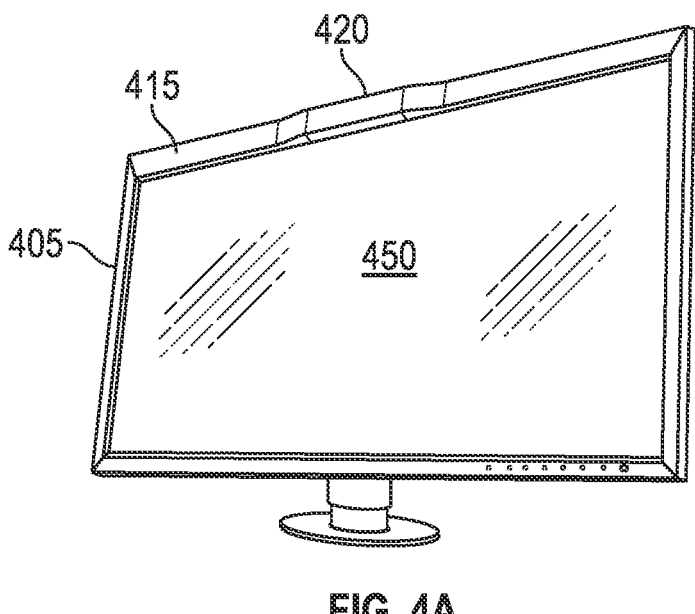
FIG. 4A is an illustration of a display monitor that includes an integrated colorimeter according to certain embodiments.

FIG. 4A is an illustration of a display monitor that includes an integrated colorimeter according to certain embodiments. In the embodiment of FIG. 4A, a display 405 includes a screen 450 that is housed within a bezel 415. As described in additional detail with regard to FIGS. 5 and 6, a colorimeter housing 420 may be included within a portion of a bezel 415 of a display 405 with an integrated colorimeter according to various embodiments. In the embodiment of FIG. 4A, the integrated colorimeter is concealed behind a door portion of the front-facing bezel 415 of the display 405. The integrated colorimeter may be moved out of this housing 420 and positioned to conduct measurements of the color output of screen 450 of the display 405.

Figure 4B:
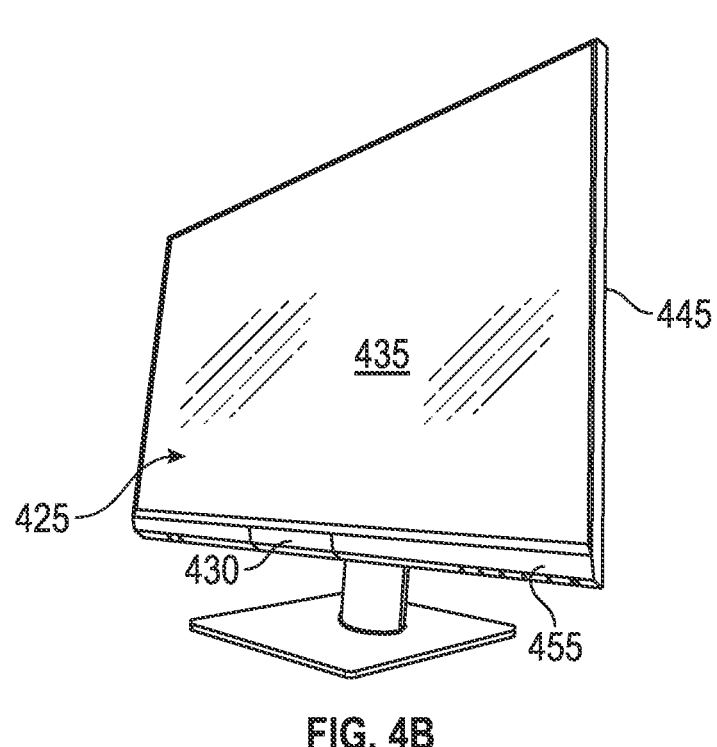
FIG. 4B is an illustration of a display monitor that includes an integrated colorimeter according to certain additional embodiments.

FIG. 4B is an illustration of an additional embodiment of a display monitor 425 that includes an integrated colorimeter. In the embodiment of FIG. 4B, display 425 includes a screen 435 that is housed within a frame the includes a bezel-less edge 445 on three sides (i.e., the top, left and right sides) of the screen 435. As described in additional detail with regard to FIGS. 5 and 6, the display 425 may include a colorimeter housing 430 that is concealed behind a door in the front-facing portion of the bottom bezel 455 of the frame. As with the embodiment of FIG. 4A, the integrated colorimeter may be moved out of this housing 430 and positioned to conduct measurements of the color output of screen 435 of the display 425. In this configuration, an integrated colorimeter is supported by display 425, while supporting bezel-less edges on three sides of the display.

Figure 4C:
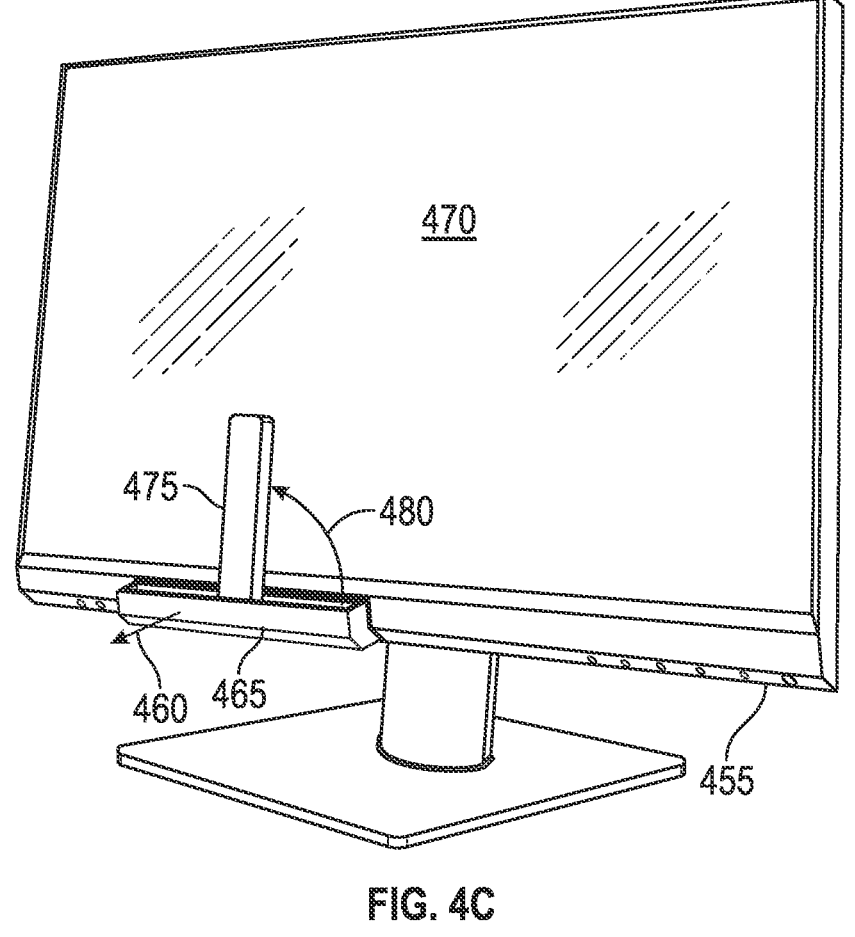
FIG. 4C is an illustration of a display monitor that includes a deployed integrated colorimeter according to certain embodiments.

FIG. 4C is an illustration of a display monitor, such as the monitor of FIG. 4B, that includes an integrated colorimeter 475 according to certain embodiments, where the integrated colorimeter 475 is in a deployed position. As described, the integrated colorimeter 475 may be housed within a compartment of the bottom bezel 455 of the display. The compartment housing the integrated colorimeter 475 may remain concealed by a tray 465 that conforms to the bezel 455 of the display. As described in additional detail with regard to FIGS. 5 and 6, the integrated colorimeter 475 may be housed within a cavity of tray 465, allowing the colorimeter to be stored within the compartment that is concealed by tray 465. As illustrated, the integrated colorimeter 475 includes a colorimeter sensor located on a rigid arm that may be raised out of the cavity of tray 465 in direction 480. In other embodiments, integrated colorimeters may be of various shapes and sizes besides the arm illustrated in FIG. 4C.

During deployment of the integrated colorimeter 475, the movement of tray 465 in direction 460 out of the bezel 455 compartment positions the integrated colorimeter 475 with sufficient clearance such that it can be rotated out of the tray 465 cavity in direction 480 without the colorimeter arm 475 contacting any portion of the bezel 455 or screen 470. The tray 465 may be configured to be moved evenly at both ends in direction 460 such that the integrated colorimeter remains parallel to screen 470 when rotated in direction 480. From this deployed position, integrated colorimeter 475 may capture light emitted by screen 470 in order to aid in characterizing and calibrating the color output of the display. In its deployed position illustrated in FIG. 4C, the integrated colorimeter 475 is oriented perpendicular with the bottom edge of the screen 470. Other embodiments may orient the integrated colorimeter differently in order to capture measurements at different positions of screen 470.

Figure 5A:
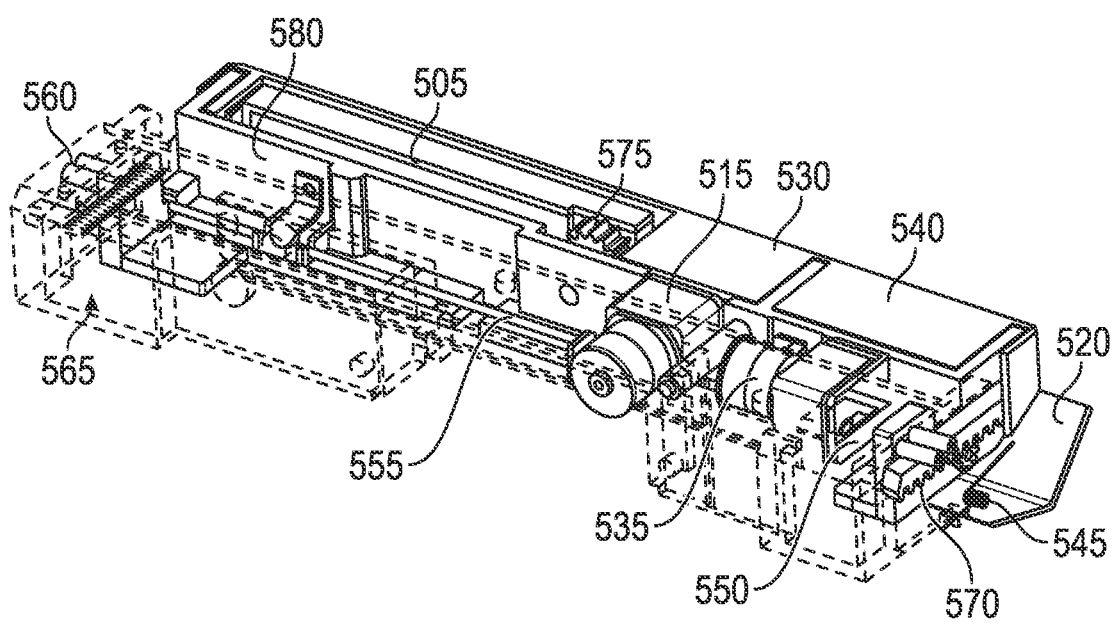
FIG. 5A is a rear-facing illustration depicting certain components of a partially deployed integrated colorimeter according to certain embodiments.

FIG. 5A is a rear-facing illustration depicting certain components of an integrated colorimeter in a partially deployed position according to certain embodiments. In FIG. 5A, an integrated colorimeter 505 is shown in a position retracted within a cavity of tray 580. As described in additional detail with regard to FIG. 6, tray 580 fits within compartment 565 such that tray door 520 may be closed, thus concealing the tray 580 and the integrated colorimeter 505 that is housed within the tray 580. In certain embodiments, the opening of tray door 520 may load a spring 545 that serves to pull tray door 520 closed once the tray 580 is returned to its stored position, thus concealing the integrated colorimeter when not in use. In certain embodiments, tray 580 may include one or more tray covers 540 that conceal inner portions of the tray 580, while leaving colorimeter 505 exposed within the cavity provided by tray 580. Such tray covers are not illustrated in the front-facing view of FIG. 5B.

In the partially deployed configuration of FIG. 5A, tray door 520 has been released from its position concealing the tray 580 and compartment 565 within the front-facing bezel of a display. With the tray door 520 allowed to swing open, via a hinged connection to the compartment 565, the tray 580 may be moved outward along axis 530 out of compartment 565 until the tray extends, either fully or partially, beyond the screen of the display. By moving tray 580 in direction 530, sufficient clearance may be created for the integrated colorimeter 505 to be raised out of the cavity of the tray 580 and positioned for measurement of the output of the screen of the display.

In order to extend and retract the tray 580, embodiments may utilize a tray driving motor 535 that drives a gear system that moves tray 580 in and out of compartment 565. In certain embodiments, the tray driving motor 535 may drive a gear shaft 555 that extends to both ends of the compartment 565. As illustrated, the gear shaft 555 may be attached to pinion gears 570 on each end, where the pinon gears 570 that engages the teeth of a rack mounted on tray 580, thus moving the tray 580 in and out of compartment 565. The gear shaft 555 drives identical pinion gears 570 on each end of the gear shaft 555 in order to move tray 580 evenly out of the compartment 565. This even movement of tray 580 maintains the integrated colorimeter 505 in an orientation that is parallel to the screen, which is particularly important when rotating the rigid arm of the integrated colorimeter 575 out of the cavity of tray 580. The movement of the tray 580 may be additionally regulated by a guide 560 that slides within a corresponding channel of the compartment 565.

Figure 5B:
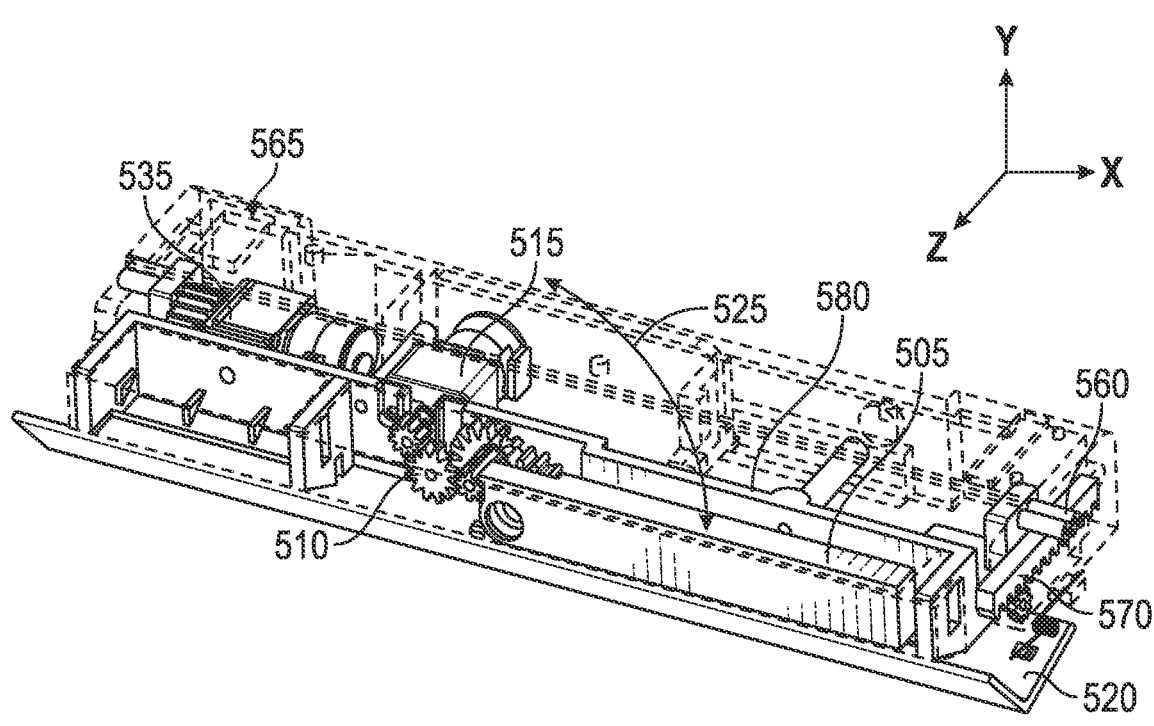
FIG. 5B is a front-facing illustration depicting certain components of a partially deployed integrated colorimeter according to certain embodiments.

FIG. 5A illustrates one axis of movement of the colorimeter 505 along direction 530 that is perpendicular to the screen. This movement along axis 530 results in the tray 580 been moved in and out of compartment 565. As described with regard to FIGS. 4A-C, the movement of tray 580 along axis 530 results in the tray 580 emerging from a front-facing portion of the bezel of a display. FIG. 5B is a front-facing view of the integrated colorimeter 505, according to various embodiments, where the colorimeter 505 is ready for deployment from within the cavity of tray 580, where the colorimeter is moved along a second axis indicated by arrow 525 that is parallel to the screen. As with FIG. 5A, the tray 580 in FIG. 5B is in an extended position with the tray door 520 having been swung open and the tray driving motor 535 having propelled the pinion gears 570 until the position of tray 580 allows the integrated colorimeter clearance sufficient for rotation along a second axis in direction 525.

In certain embodiments, the movement along axis 525 of the integrated colorimeter 505 to its deployed position may be generated by a sensor arm motor 515. As illustrated, the sensor arm motor 515 may drive a set of gears 510 that engage a sensor rotation gear 575 integrated in the base of the arm of colorimeter 505. By driving the gear system 510, the sensor arm motor 515 may rotate gear 575 in order to raise the colorimeter along axis 525 from the retracted position, illustrated in FIG. 5B, where the colorimeter 505 is still within the cavity of tray 580. As described in additional detail with regard to FIGS. 6A-C, once the colorimeter 505 has been rotated along axis 525 to a deployed position, the tray driving motor 535 may be engaged in order to further position the colorimeter 505 along axis 530 such that the colorimeter may be positioned closer to the screen in order to improve the measurement obtained by the colorimeter sensor.

Figure 6A:
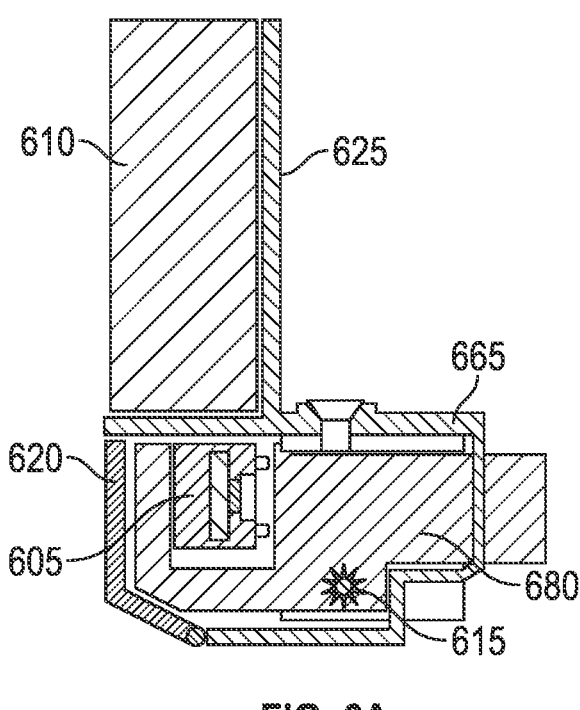
FIG. 6A is a cutaway illustration depicting certain components of an integrated colorimeter housed within a computer display according to certain embodiments.

FIG. 6A is a cutaway illustration depicting certain components of an integrated colorimeter 605 housed within a computer display according to certain embodiments. In FIG. 6A, the illustrated cutaway is taken from a plane that shows the colorimeter 605 housed within a cavity of a tray 680. As described above, the tray 680 is located within a compartment 665 of a display monitor that includes a screen 610 housed within a frame 625. In FIG. 6A, the integrated colorimeter 605 is concealed behind the tray door 620 that forms a portion of the front-facing, lower bezel of the monitor, such as described with regard to FIG. 4B. In this stored configuration, the tray 680 housing the integrated colorimeter 605 and the compartment 665 in which tray 680 is stored are both concealed by the tray door 620 within the front-facing bezel of the display.

Figure 6B:
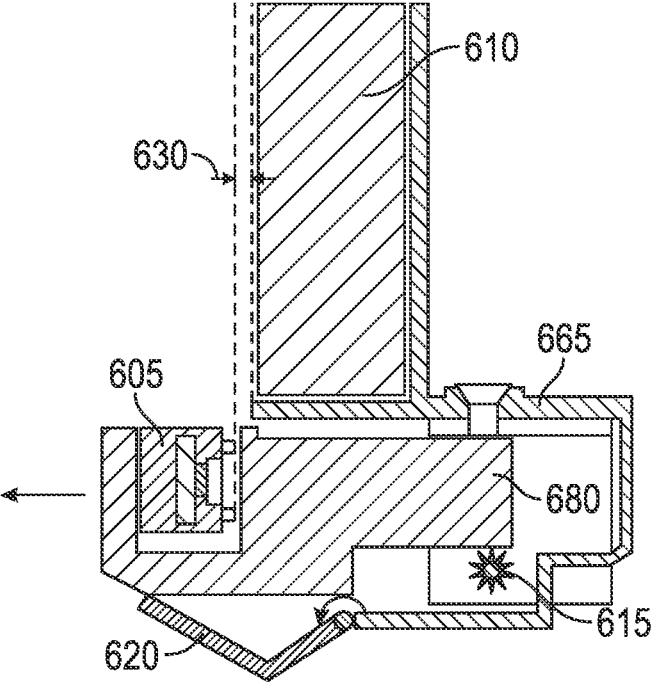
FIG. 6B is a cutaway illustration depicting certain components of an integrated colorimeter in a first stage of deployment from within a computer display according to certain embodiments.

In FIG. 6B, the tray door 620 has been pushed open, as described above, through the operation of a motor that swings the tray door 620 about a hinge connection with the compartment 665. In certain embodiments, the movement of tray door 620 may load a spring that serves to close tray door 620 behind retraction of tray 680 back into compartment 665. With the tray door 620 open as illustrated in FIG. 6B, the tray 680 is moved out of compartment 665 of the display monitor. As described above, the compartment 665 housing the integrated colorimeter 605 may include a tray driving motor for moving the tray 680 in and out of compartment 665. The tray driving motor utilizes gears to turn a driveshaft 615, the position of which is illustrated in the cutaway of FIG. 6B, that includes pinion gears on each end. The pinion gears engage with teeth of a rack portion of the tray 680, such that turning driveshaft 615 serves to move the tray 680 in and out of compartment 665.

As described with regard to FIG. 1, in various embodiments, a display monitor including an integrated colorimeter may utilize an embedded controller that is configured to operate the motors utilized by the described colorimeter deployment system. In certain embodiments, such embedded controllers may be configured with instructions for operation of a tray driving motor to move the tray 680 a predefined distance out of compartment 665. As illustrated in FIG. 6B, this predefined travel distance of tray 680 out of compartment 665 is selected such that integrated colorimeter 605 has sufficient clearance 630 from screen 610 that allows rotation of the colorimeter 605 into position without making contact with the screen 610, or any portion of the surrounding bezel or frame 625.

Figure 6C:
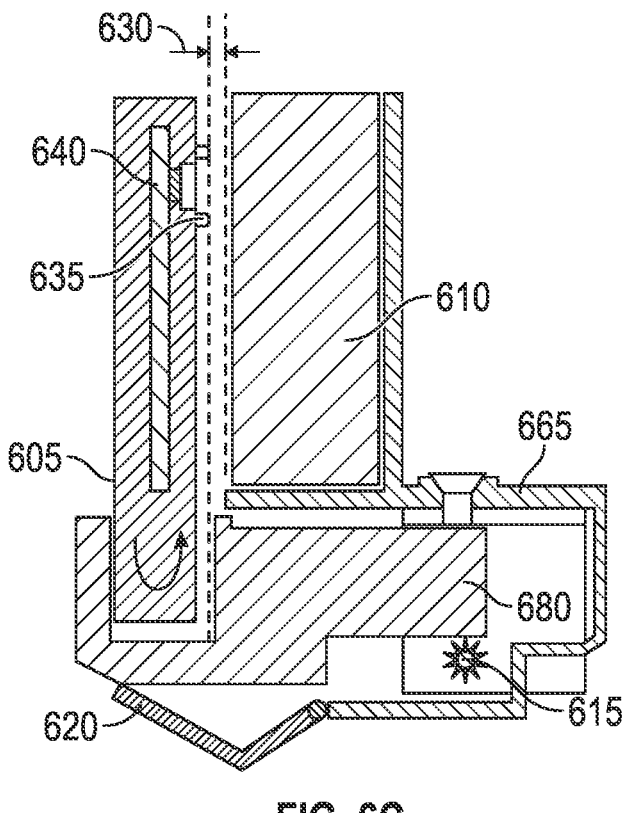
FIG. 6C is a cutaway illustration depicting certain components of an integrated colorimeter in a second stage of deployment from within a computer display according to certain embodiments.

In FIG. 6C, the integrated colorimeter 605 has been raised out of the cavity of tray 680, which has been moved out of compartment 665 such that sufficient clearance 630 is provided for the colorimeter to avoid any contact while being raised out of the cavity of the tray 680. As described with regard to FIGS. 5A and 5B, a sensor arm motor may drive a gear system that engages a gear included on the colorimeter sensor arm 605. By the engagement of this gear on the sensor arm, the sensor arm motor may rotate the colorimeter arm about an attachment to the tray 680 until the colorimeter arm is perpendicular to the base of the screen 610. This positioning of the colorimeter sensor arm 605 is reflected in the deployed colorimeter 450 of FIG. 4C.

In certain embodiments, the embedded controller of the display may be configured with instructions for selecting different angles of deployment of the colorimeter sensor arm 605. The embedded controller may be configured to deploy the integrated colorimeter at different positions on screen 610 in support of testing and calibration routines that utilize measurements taken from multiple screen locations. In certain embodiments, the colorimeter sensor arm 605 may be deployed at different angles in order to collect readings at different screen locations during a single operating session. In other embodiments, the colorimeter sensor arm 605 may be deployed at a different angles, but remains positioned in one screen location during an operating session.

Figure 6D:
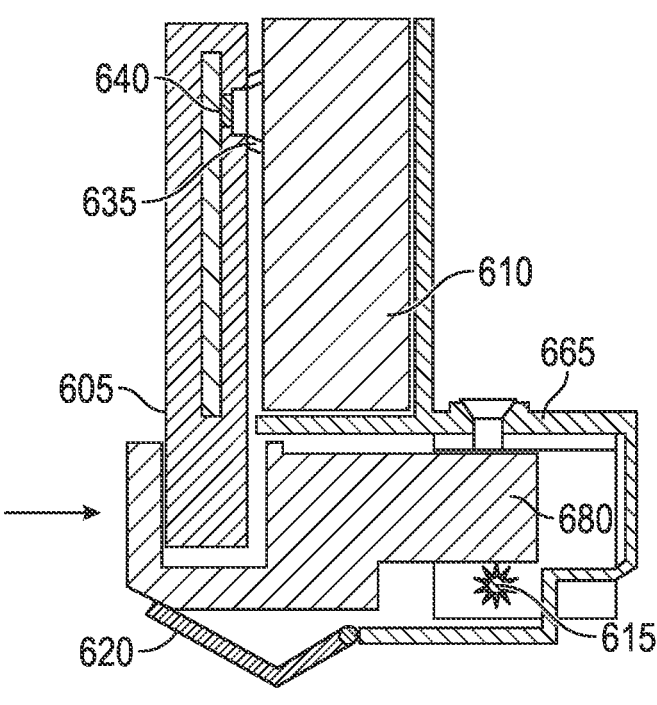
FIG. 6D is a cutaway illustration depicting certain components of an integrated colorimeter in a third stage of deployment from within a computer display according to certain embodiments.

Before any measurements are taken by colorimeter, FIG. 6D illustrates the positioning of the colorimeter sensor 640 that is used to collect the colorimeter readings based on the light captured from screen 610. In certain embodiments, the colorimeter sensor 640 may be surrounded by a rubber ring 635 that may protrude from the colorimeter sensor arm 605 as illustrated in FIG. 6B. The rubber ring 635 blocks ambient light from reaching the colorimeter sensor 640 when the rubber ring 635 is placed in contact, or near contact, with the screen 610. Other embodiments may utilize various other, light-blocking, compressible and nonabrasive materials for ring 635. Other embodiments may also utilize different geometric shapes besides a ring for surrounding the colorimeter sensor 640. As illustrated in FIG. 6B, the tray 680 may be further positioned by the operation of the tray driving motor to bring tray 680 back into compartment 665 until the rubber ring 635 on the colorimeter sensor arm 605 is brought in slight contact with screen 610.

Through the positioning illustrated in FIG. 6D, the colorimeter sensor 640 may conduct measurements that are free of ambient light. By positioning rubber ring 635 in contact with screen 610, no ambient light, or at least minimal ambient light, reaches the colorimeter sensor 640 when it is conducting measurements of the light emitted from screen 610. The measurements taken using a colorimeter sensor 640 positioned in this manner provide superior accuracy in comparison to existing colorimeters, such as described with regard to FIGS. 2 and 3. As described with regard to the existing colorimeter of FIG. 2, such colorimeters are limited to a single axis of motion (i.e., movement of the colorimeter parallel to the screen) when positioning the colorimeter sensor. In the existing colorimeter of FIG. 2, the colorimeter emerges from a door in the inner-facing lip of the bezel and swings upwards into its deployed position. From this deployed position, a gap necessarily remains between the colorimeter and the screen of the display. Due to this gap, measurements taken by existing colorimeters include ambient light that reaches the colorimeter. By incorporating additional movement of an integrated colorimeter along a second axis of deployment (i.e., movement of the colorimeter sensor 640 perpendicular to the screen), an integrated colorimeter according to the embodiments described herein allow for improved accuracy in the readings that are captured.

Once a colorimeter measurement has been completed, the integrated colorimeter 605 may be returned to its position housed within compartment 665 of the display monitor. This process may be conducted by reversing the operations described with regard to FIGS. 6A-D. The colorimeter 605 is moved away from the screen 610 through operation of the driveshaft 615 by the tray driving motor. At this time, the colorimeter sensor arm 605 may be repositioned by the operation of the sensor arm motor, where the repositioning may place the colorimeter 605 back in the cavity of tray 680, or may place the colorimeter 605 at a new angle of deployment in order to support additional measurements by the colorimeter sensor 640 at a different position on the screen 610. Once the colorimeter has been returned to the tray 680, the tray driving motor may be operated to retract the tray 680 back into the compartment 665. Through the force provided by a spring that was loaded during deployment of the tray 680, the tray door 620 may close behind the retracting tray 680, such that the integrated colorimeter is concealed within the lower bezel of the integrated display behind the tray door 620.

FIGS. 5A-B and FIGS. 6A-D illustrate the deployment of an integrated colorimeter that is stored within a lower, front-facing bezel of a display. As described, with regard to FIG. 4B, in certain embodiments, an integrated colorimeter may be similarly stored within an upper, front-facing bezel of a display. In various embodiments, the integrated colorimeter deployment described with regard to FIGS. 5A-B and FIGS. 6A-D may be adapted for use in an upper, front-facing bezel of a display, or for use in a left or right front-facing bezel of a display.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for deploying a colorimeter of a display for presenting information generated by an Information Handling System (IHS), the method comprising:

concealing a compartment housing a tray behind a door of a bezel bordering the display on at least one side;

deploying the tray from the concealed compartment of the bezel via the door through operation of a first motor that moves the tray along an axis perpendicular to the screen;

raising the colorimeter from within the tray through operation of a second motor that raises the colorimeter along an axis parallel to the screen, wherein the colorimeter comprises a sensor for measuring light emitted by the screen, wherein the sensor is surrounded by a non-abrasive material, and wherein the colorimeter is raised at a first angle in order to measure light emitted at a first location of the screen and wherein the colorimeter is raised at a second angle in order to measure light emitted at a second location of the screen;

when the colorimeter is raised at the first angle, moving the tray toward the screen along the axis perpendicular to the screen using the first motor, until the non-abrasive material contacts the screen such that the non-abrasive material blocks all ambient light from reaching the sensor;

after the light emitted at the first location of the screen is measured by the colorimeter, moving the tray away from the screen along the axis perpendicular to the screen using the first motor, until a gap exists between the non-abrasive material and the screen;

when the colorimeter is raised at the second angle, moving the tray toward the screen along the axis perpendicular to the screen using the first motor, until the non-abrasive material contacts the screen such that the non-abrasive material blocks all ambient light from reaching the sensor; and after the light emitted at the second location of the screen is measured by the colorimeter, moving the tray away from the screen along the axis perpendicular to the screen using the first motor, until a gap exists between the non-abrasive material and the screen.

2. The method of claim 1, wherein the non-abrasive material is ring-shaped.

3. The method of claim 1, wherein the non-abrasive material is compressible.

4. The method of claim 1, wherein the non-abrasive material comprises rubber.

* * * * *